(12) United States Patent
Bellandi et al.

(10) Patent No.: US 7,821,706 B2
(45) Date of Patent: Oct. 26, 2010

(54) DUAL OPTICAL PATH PERISCOPE

(75) Inventors: Edward A. Bellandi, San Jose, CA (US); Jeff Gamelsky, Palo Alto, CA (US)

(73) Assignee: BAE Systems Land & Armaments, L.P., Arlington, VA (US)

( * ) Notice: Subject to any disclaimer, the term of this patent is extended or adjusted under 35 U.S.C. 154(b) by 469 days.

(21) Appl. No.: 11/775,522

(22) Filed: Jul. 10, 2007

(65) Prior Publication Data

US 2009/0015915 A1   Jan. 15, 2009

(51) Int. Cl.
G02B 23/08  (2006.01)

(52) U.S. Cl. .................. 359/402; 359/399; 359/850

(58) Field of Classification Search ......... 359/399–406, 359/850–861
See application file for complete search history.

(56) References Cited

U.S. PATENT DOCUMENTS

| 2,173,106 | A | * | 9/1939 | Gerhardt | 359/857 |
| 3,013,471 | A | * | 12/1961 | Clave et al. | 359/402 |
| 3,482,897 | A | * | 12/1969 | Hopp | 359/402 |
| 3,619,040 | A | * | 11/1971 | Rickets | 359/834 |
| 4,173,394 | A | * | 11/1979 | Clave et al. | 359/669 |
| 4,561,733 | A | * | 12/1985 | Kreischer | 359/856 |
| 4,572,625 | A | | 2/1986 | Arndt et al. | |
| 4,732,438 | A | | 3/1988 | Orbach et al. | |
| 4,934,246 | A | | 6/1990 | Benson et al. | |
| 5,128,803 | A | | 7/1992 | Sprafke | |
| 5,315,915 | A | | 5/1994 | Sprafke | |
| 5,526,177 | A | | 6/1996 | Fantone | |
| 6,122,100 | A | | 9/2000 | Miller | |
| 6,643,969 | B1 | | 11/2003 | Avizonis, Jr. | |
| 6,991,340 | B2 | | 1/2006 | Townsend, Jr. et al. | |

FOREIGN PATENT DOCUMENTS

JP   08-304714   11/1996

OTHER PUBLICATIONS

International Search Report for International Application No. PCT/US2008/008177 dated Jan. 8, 2009.

* cited by examiner

*Primary Examiner*—Thong Nguyen
(74) *Attorney, Agent, or Firm*—Patterson Thuente Christensen Pedersen, P.A.

(57) ABSTRACT

A direct vision periscope is disclosed having a second set of mirrors strategically positioned within a wide angle trapezoidal periscope. The main optical path has a vertical field of view of 24° above and below horizontal while the secondary optical path provides a field of view of 12° to 59° above horizontal to allow the occupants to see elevated areas. When used on military vehicles, multiple periscopes may be disposed about the operator's compartment to create a near panoramic view.

21 Claims, 8 Drawing Sheets

46

47

49

DUAL OPTICAL PATH PERISCOPE

GOVERNMENT INTEREST

The invention was made by an agency of the U.S. Government or under a contract with an agency of the U.S. Government. The name of the U.S. Government agency is the United States Army and the Government contract number is W56HZV-05-0724.

FIELD OF THE INVENTION

The present invention pertains to an apparatus for external viewing from within a secure location and more particularly to a dual optical path trapezoidal wide angle periscope for military applications that includes laser protection, ballistics protection, and an expanded field of regard to handle threats from above.

BACKGROUND OF THE INVENTION

The subject of this invention is the design of a new type of direct vision periscope. This periscope is designed to meet requirements for a dramatic increase in the vertical field of regard over existing periscope designs. Here, field of regard refers to the number of degrees of visual data available to the sensor when sensor movement is allowed. Existing periscope designs for military applications do not allow a soldier to see an enemy on elevated areas or rooftops in an urban combat setting. This lack of vision capability places greater risks on the soldiers and their equipment. A periscope with a greater vertical field of regard would offer improved capability for area surveillance and hence soldier survivability and safety.

There are no simple direct vision periscopes currently designed that can achieve a vertical field with a range of view of an estimated −24° to +59°. For example, the wide angled rapezoidal periscope described in U.S. Pat. No. 4,934,246 provides for a low glint reflection, laser eye safe filters and ballistic features. However, vertical field of regard is limited by mirror placement within the periscope body. One way to increase the field of regard is with moveable optical systems. However, there is always an issue of reliability with complex moveable mirror systems. No current direct vision periscope has the capability of seeing such a large vertical field of regard in a passive device without adjustable mechanism such as moveable or rotating mirrors or moveable mounting devices.

Thus there is a need for periscopes with an increased field of regard obtained passively. The system should not require the operator to make manual adjustments to the viewing system components or to the mounting angle. The periscope should be trapezoidal in shape to take advantage of close semicircular mounting when used in combination with other periscopes to achieve a panoramic exterior view without blind spots. The periscope should also provide ballistics, low glint and laser eye safe filters.

SUMMARY OF THE INVENTION

The present invention is a dual optical path periscope. The increased vertical field of regard is achieved by creating a second periscope within the body of a more standard periscope design. This is accomplished by adding a second set of mirrors that are strategically placed within the envelope of the standard periscope to create a second optical path that favors looking upward. This second optical path is designed to operate in combination with a primary optical path periscope that favors looking straight ahead and down. Both optical paths have a set of mirrors that are strategically placed within the same housing to economize space and ease of human interaction. The paths overlap within a common housing so that the operator, with some intuitive head movement, can achieve the entire vertical range requirement.

An advantage of this periscope design is to increase the upward vision capability to at least +45° while not sacrificing the normal forward and down look capability. A second advantage is to achieve upward vision with a passive system that does not require the operator to make adjustments to the viewing system components or to the mounting angle. This passive approach capitalizes on the intuitive human behavioral method of moving the eye position down to look up higher. This intuitive action brings the secondary path into view. The secondary viewing path takes over the upward vision approximately where the primary path left off, so as not to confuse the viewer with an interrupted or non-continuous view. This is especially advantageous in a military environment where the operator is a soldier encumbered by personal headgear. A third advantage is the ability to mount the periscope into a semi-circular configuration closely nested with other similar periscopes to achieve an optimum near panoramic view with direct optics and no distortion.

The present invention involves the creation of a second periscope within a periscope. This second optical viewing path overlaps the normal forward viewing path obtained from the primary set of mirrors. The secondary viewing path utilizes the same, although larger than normal, interior and exterior windows as the primary viewing path. The overall package maintains similar features to the wide angled trapezoidal periscope in general shape, mounting features, low glint window angles, laser eye safe filters and ballistic features. The wide angled trapezoidal periscope design was chosen because it has desirable features that are enhanced by the new dual path viewing capability. However this dual path design can be applied to older rectangular bodied periscopes as well. In the preferred embodiment, each pair of mirrors and windows are parallel to avoid optical distortions.

In the preferred embodiment, the main optical path has a vertical field of regard of 24° below to 24° above the horizon. The second optical path has a vertical field of regard of 12° above to 59° above the horizon. In this embodiment the overlap of the two optical paths is 12° but the overlap and the field of regard may be changed accordingly to satisfy specific requirements. Since the design is dependant on the precise vertical cross section and the shape, size and placement of the mirrors, the periscope can have a variety of widths based upon the application and mounting design for a specific installation.

The front window of the periscope is angled so as to minimize glare, reflections and improve the signature management of the periscope and vehicle system. This new periscope is planned for use on military combat vehicles where direct optic vision is required for vehicle control under ballistic protection. Several periscopes mounted closely in a semi-circular arrangement provide a near panoramic view of the surrounding environment. When mounted in a hatch they can provide the soldier with unity of vision for close in maneuverability and increasingly important upward view for rooftop and aerial threats. In conjunction with the properly designed hatch or vehicle, mounting the periscope with its offset optical path, provides ballistic protection for the human operator's head. Distortion free direct optics allows the human operator the passive reliability of natural vision, depth perception and situational awareness.

Other indirect vision devices and sensors may also be used to enhance and augment the direct vision of the periscopes.

DETAILED DESCRIPTION OF THE DRAWINGS

Figure 1:
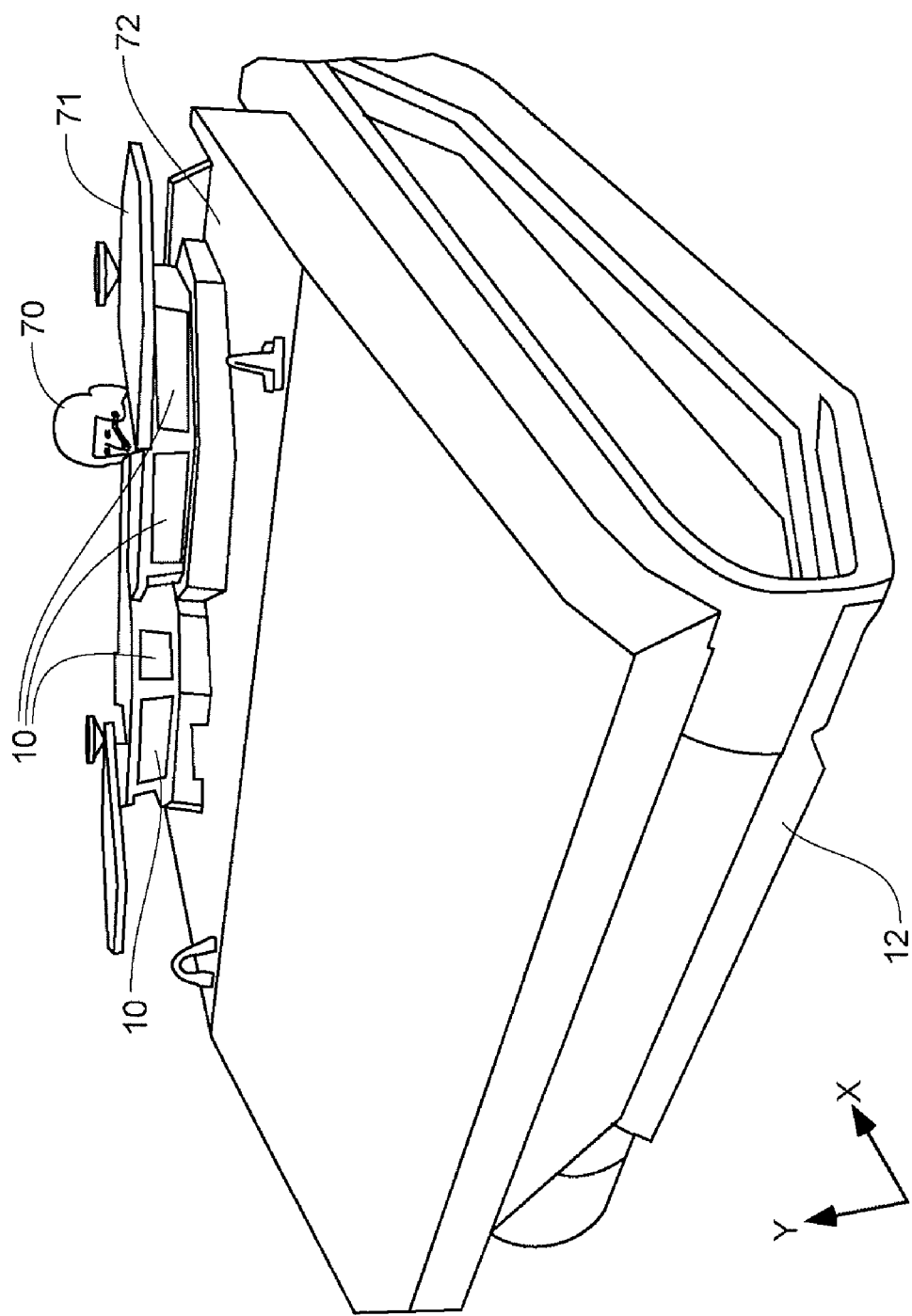
FIG. 1 is a perspective view of a military vehicle having an operators station, the present invention mounted adjacent for viewing.
Figure 2:
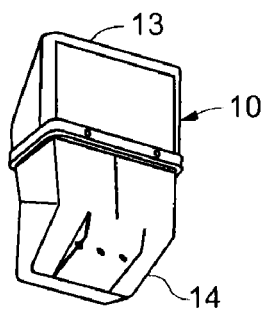
FIG. 2 is a perspective view of the present invention.
Figure 3:
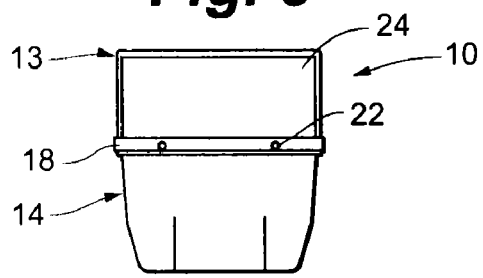
FIG. 3 is a front elevation viewed of the present invention.
Figure 4:
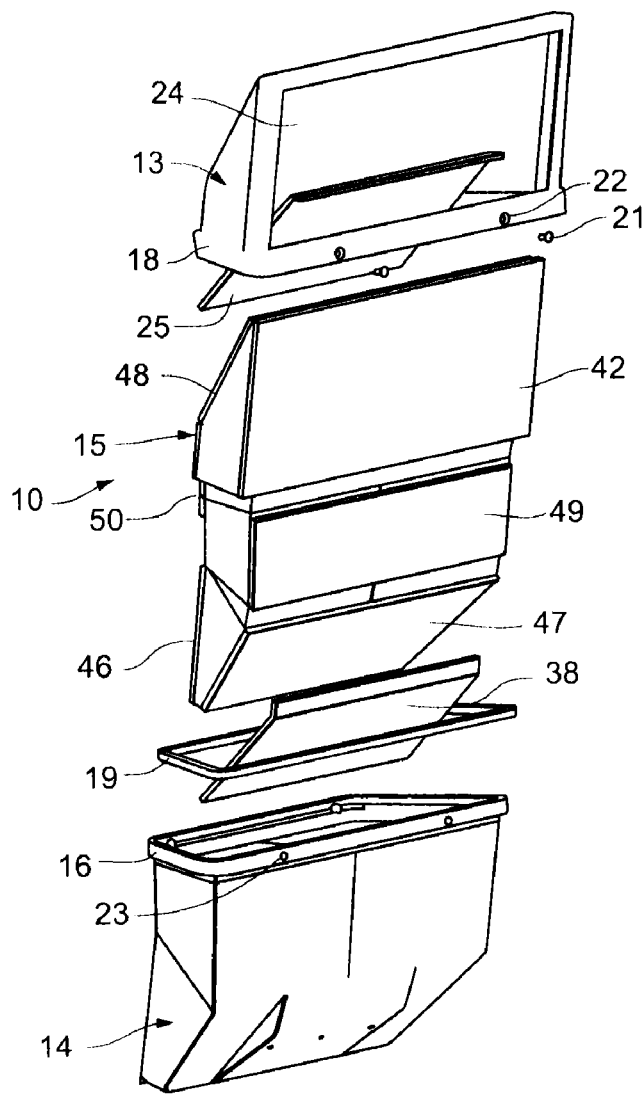
FIG. 4 is an exploded perspective view illustrating the several components of the present invention.
Figure 5:
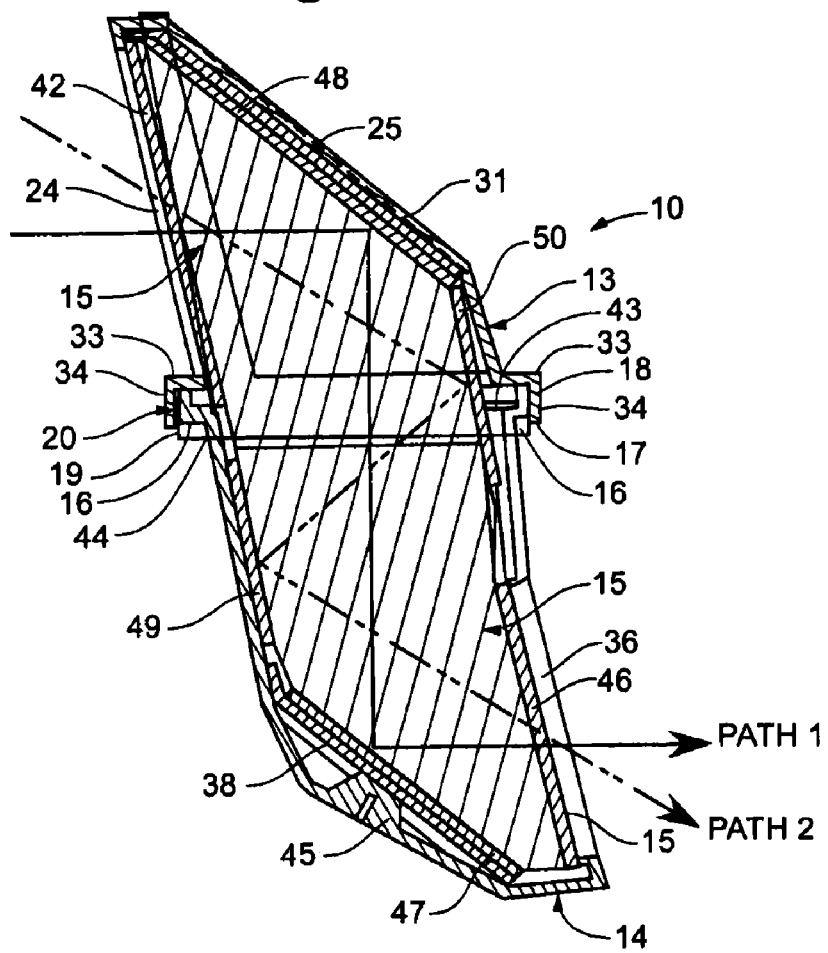
FIG. 5 is an enlarged vertical section of the present invention.

The wide angle trapezoidal dual path periscope 10 of the present invention is illustrated as being on a military vehicle 12 and depicted in FIG. 1. As illustrated, a plurality of periscopes 10 are mounted so as to extend through the hull of the military vehicle 12. In a first embodiment, a plurality of periscopes 10 are situated about the operator's position 70 to provide a wider field of regard than that achieved by a single periscope 10. Each periscope 10 is positioned between the hatch 71 and the vehicle body or hull 72. Although the periscope 10 has been illustrated relative to a military vehicle, it will be understood that the periscope 10 may be used on either vehicles or in fixed locations. For example, the periscope 10 may be used on bomb shelters, observation towers, or any other location where the observer's safety may be at issue during a direct observation.

The dual path periscope 10 is illustrated in FIGS. 2-5. When used on a military vehicle 12, each of the dual path periscopes 10 include an upper armored housing 13 and a lower housing 14. The lower housing 14 extends through openings in the hull 72 of the military vehicle 10. The upper armored housing 13 includes a mating flange 18 for attachment of the lower housing 14. The dual path periscope 10 is thus generally comprised of an upper armored housing 13, a lower housing 14 and an optical system 15. The optical system 15 extends from within the lower housing 14 to the upper armored housing 13 and may be a monolithic structure as depicted, for example, in FIGS. 4 and 5. The lower housing 14 includes an upper rim 16 which mates with the inner edge 17 of the mating flange 18 of the upper armored housing 13. It is envisioned that a gasket seal 19, made of silicone or similar material, is disposed about the upper margin 20 of the lower housing 14. At least one fastener 21 is inserted through upper housing aperture 22 to mate with the lower housing aperture 23, although the use of fasteners may be avoided by bonding the housings together with adhesives. It is envisioned that the upper housing apertures 22 are counter sunk so as to maintain a low exterior profile. The fastener 21 may be a screw or any suitable alternative.

Figure 6:
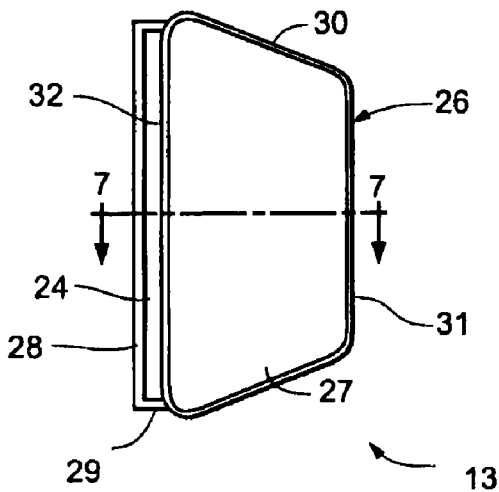
FIG. 6 is a top elevational view of the upper case of the present invention.
Figure 7:
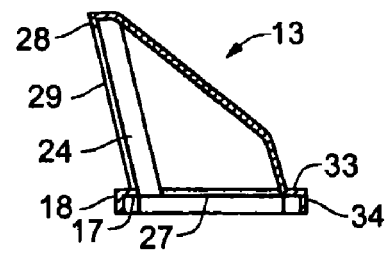
FIG. 7 is a sectional view of FIG. 6 in the direction 7-7.

The upper housing 13, as illustrated in FIGS. 6 and 7, is comprised of a window aperture 24, an internal shock pad 25, a trapezoidal body 26 and an optics aperture 27. The window aperture 24, set within the front wall 32, is defined by an upper lip 28, side lips 29, and the mating flange 18. The upper lip 28 is canted out relative to the mating flange 18 so as to protect the window aperture 24 from rain or falling objects. As a result the window aperture 24 in the first embodiment is disposed at an angle 77° with respect to the horizontal axis. The mating flange 18 extends across the base of the window aperture 24 and then blends into the side walls 30 of the trapezoidal body 26. The mating flange 18 also extends from the rear wall 31 of the trapezoidal body 26. The trapezoidal body 26 has a front wall 32 generally longer than the rear wall 31 with side walls 30 evenly angled to intersect the front and rear walls, respectively. An upper shock pad 25 conforms to the interior face of rear wall 31 of the upper housing 13. The upper shock pad 25 is preferably constructed of a silicone sponge of a closed cell design with a self stick pressure adhesive on one side for bonding to the inner surface of rear wall 31. Mating flange 18 includes an outwardly projecting rim 33 extending distally from upper housing 13 and a base wall 34 extending vertically from the distal end of projecting rim 33. The base wall 34 forms the outer barrier for the lower housing 14.

Figure 8:
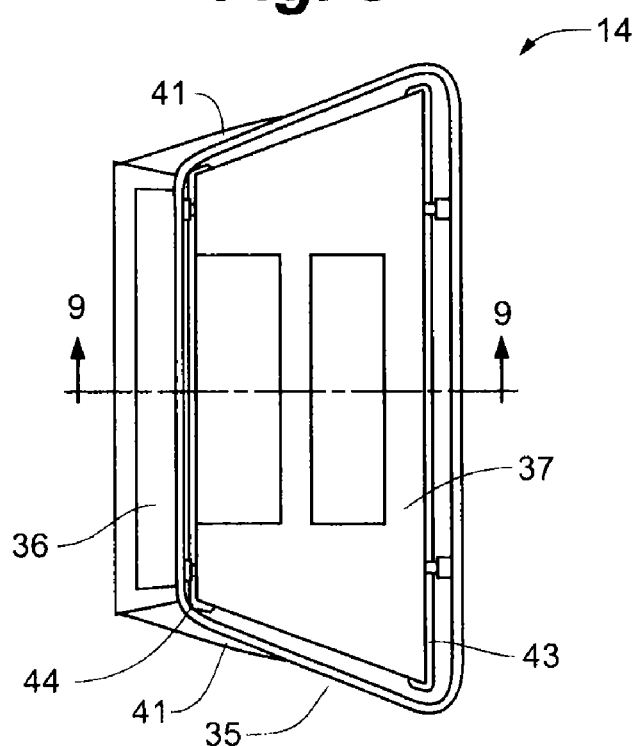
FIG. 8 is a top elevational view of the lower case of the present invention.
Figure 9:
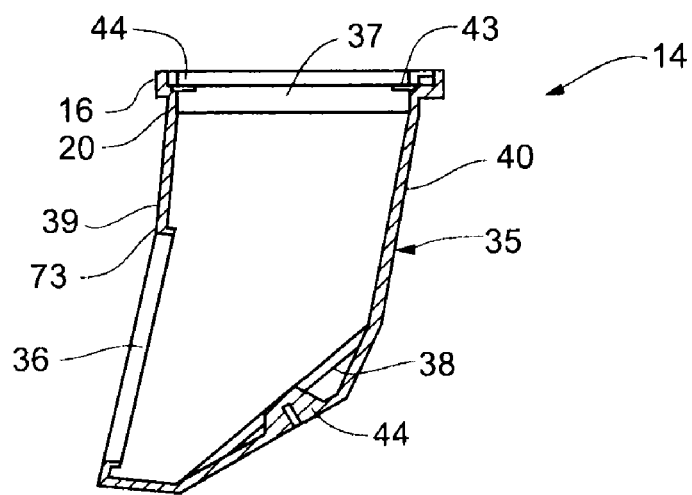
FIG. 9 is a sectional view of FIG. 8 in the direction 9-9.
Figure 10:
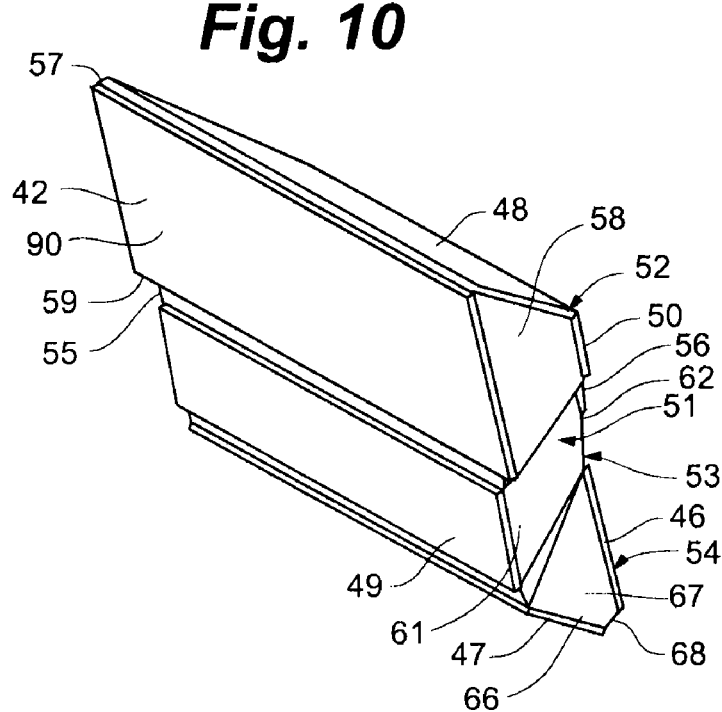
FIG. 10 is an isometric view of the optical elements of the present invention.
Figure 11:
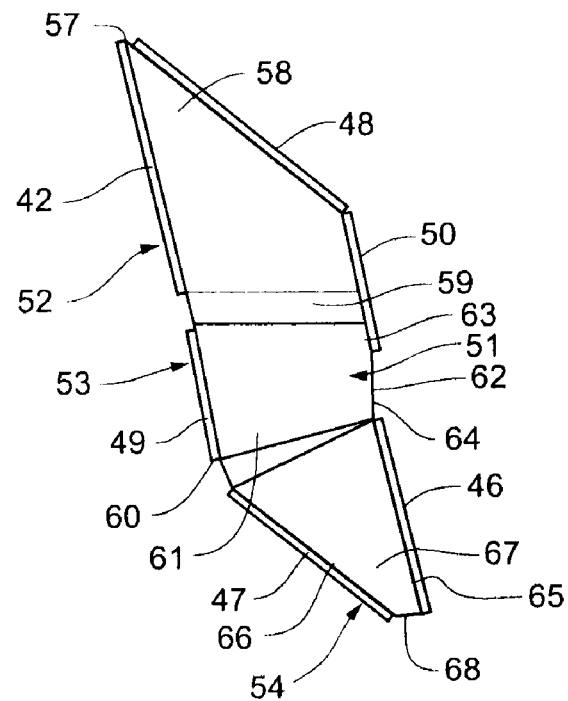
FIG. 11 is a sectional view of the optical elements depicted in FIG. 10.
Figure 12:
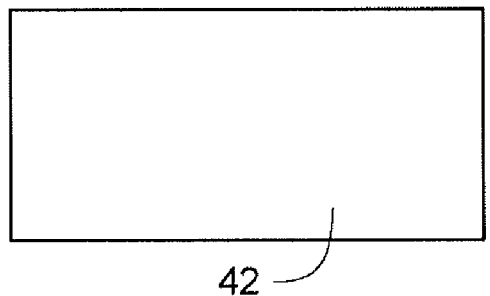
FIG. 12 is a plan view of the upper window of the present invention.
Figure 13:
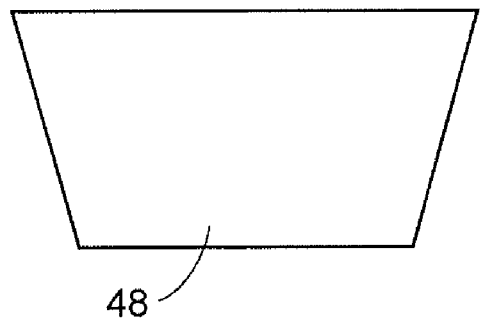
FIG. 13 is a plan view of the upper mirror of the present invention.
Figure 14:
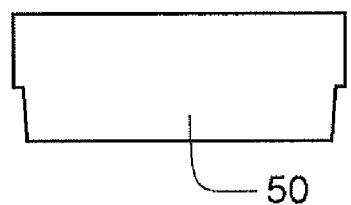
FIG. 14 is a plan view with the middle upper mirror of the present invention.
Figure 15:
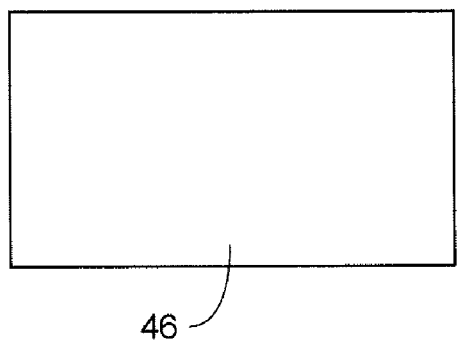
FIG. 15 is a plan view of the lower window of the present invention.
Figure 16:
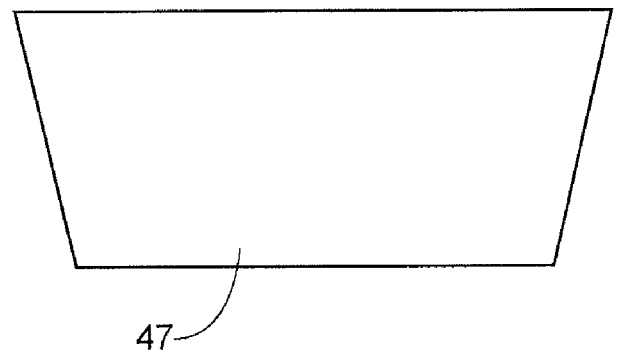
FIG. 16 is a plan view of the lower mirror of the present invention.
Figure 17:
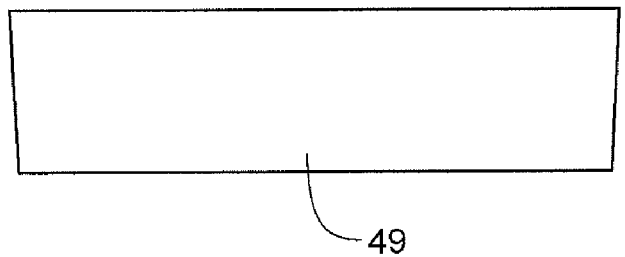
FIG. 17 is a plan view of the middle lower mirror of the present invention.

The lower housing 14 is illustrated in FIGS. 8-9. Lower housing 14 includes a body 35 that defines a lower window aperture 36 and a lower optics aperture 37. Lower housing 14 also includes a shock pad 38. The body 35 is a generally trapezoidal shaped container comprised of a window face 39, a rear face 40, and lower side walls 41. The window face 39 is canted so that a lower margin 73 extends beyond the upper window margin 20. As a trapezoid, the window face 39 is longer than the opposing rear face 40, while side walls 41 are angled to run from window face 39 to rear face 40. An upper rim 16 extends about the upper margin 20 of the lower housing 14. The upper rim 16 abuts the inner face 17 of projecting rim 33. Upper window support 44 extends inward from the upper rim 16 so as to act as a base for upper window 42. On the opposing side, mirror support 43 extends inward so as to provide a rear support for elements of the optical system 15. The shock pad 38 is preferably constructed of a closed cell silicone sponge with a self stick pressure adhesive disposed on one side. The shock pad 38 conforms to the mount section 45 of the rear face 40.

FIGS. 10-17 depict the optical system 15 of the present invention. The optical system 15 includes a lower window 46, a lower primary mirror 47, an upper primary mirror 48, a lower secondary mirror 49, an upper secondary mirror 50 and an upper window 42. The lower primary mirror 47 and the upper primary mirror 48 create an optical path with a field of regard of 24° below to 24° above the horizon. The lower secondary mirror 49 and the upper secondary mirror 50 create an optical path with a field of regard of 12° above to 59° above the horizon.

The lower window 46 is comprised in a preferred embodiment of a clear polycarbonate. The outer surface of lower window 46 includes an abrasive resistant coating. The lower window 46 fits within lower window aperture 36.

Figure 18:
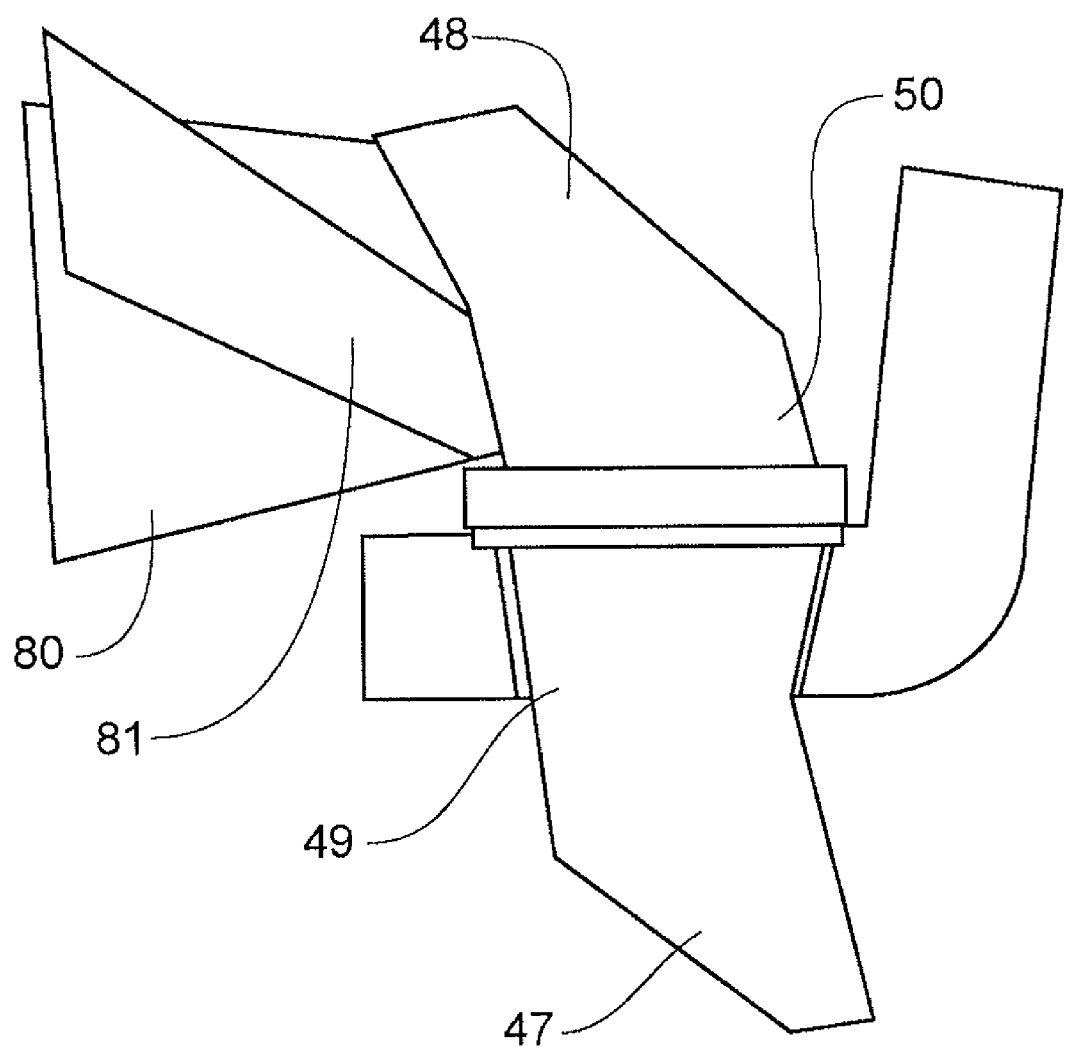
FIG. 18 is a sectional view of the present invention illustrating the vertical fields of view relative to the horizontal axis through the dual path periscope.

The optical system 15 is disposed about a block 51 of an optical quality material such as plastic methacrylate or similar material. Block 51 as depicted in FIGS. 18-20 is a multi-faceted structure to support placement of upper primary mirror 48, upper secondary mirror 50, lower primary mirror 47, lower secondary mirror 49, lower window 46 and upper window 42. Upper window 42 may support laser filter 90. Block 51 is comprised of an upper mirror section 52, transition section 53 and a lower mirror section 54. Upper mirror section 52 includes a T-shaped front face 55, T-shaped rear face 56, trapezoidal upper face 57 and upper side faces 58. The width of T-shaped front face 55 is greater than T-shaped rear face 56. Upper side faces 58 incorporate a cantilevered section 59 that corresponds to the mating flange 18 of upper housing 13. Transition section 53 includes a lower secondary mirror face 60, transition side faces 61 and transition rear face 62. Transition rear face 62 has an upper section 63 that supports a lower margin of upper secondary mirror 50 and a lower section 64 that transitions to the lower mirror section 54. Lower secondary mirror face 60 supports the lower secondary mirror 49. The width of lower secondary mirror face 60 is greater than the width of transition rear face 62. Lower mirror section 54 includes lower window face 65, opposing lower primary mirror face 66, side faces 67 and bottom face 68.

The vertical field of regard of the dual optical path periscope 10 of the present invention is illustrated in FIG. 18 based on different viewing options of the operator's eyes. The primary forward path 80 is illustrated so as to show a vertical field of regard of 24° above and 24° below the mounting surface. Primary forward path 80 is achieved through upper primary mirror 48 reflecting light to lower primary mirror 47. The secondary upward path 81 is illustrated so as to show a vertical field of regard of 59° above and 12° above the mounting surface. The present invention 10 thus utilizes the upper secondary mirror 50 and lower secondary mirror 49 to create an independent optical path within the optical system 15.

From the foregoing description it is apparent that the trapezoidal periscope of the present invention includes an upper housing 13 which is larger in width and length than the lower housing 14. Since the lower housing 14 is generally smaller than the upper housing 13 the lower housing 14 extends into the crew/operator area.

In operation the dual optical path periscope 10 is disposed about the operator position 70. The operator chooses one of a plurality of periscopes 10 to utilize. When the operator's eyes are in a normal eye position as indicated by "Path 1" in FIG. 5, the operator will see reflections from upper primary mirror 48 to lower primary mirror 47. The field of regard for the operator utilizing "Path 1" is −24° to +24°. The vertical field of regard for the operator utilizing "Path 2" is +24° to +59°. In a preferred embodiment the operator does not experience a transition zone between the two optical paths, however an optical transition zone may exist between "Path 1" and "Path 2" so that the operator is aware of the differing optical paths.

Although the preferred embodiment is disclosed, it will be apparent that modification and variation may be made without departing from what is regarded to be the subject matter of the invention.

The invention claimed is:

1. An armored periscope system for a military vehicle, the periscope system including:
    a protective housing mounted to the military vehicle, the protective housing including an upper window and a lower window;
    an optical support structure disposed within the protective housing;
    a primary optical mirror system attached to the optical support structure, the primary optical mirror system including a first upper mirror and a first lower mirror, the first lower mirror being displaced vertically from the first upper mirror;
    a secondary optical mirror system attached to the optical support structure the secondary optical mirror system including a second upper mirror and a second lower mirror, the second lower mirror being displaced vertically from the second upper mirror and the second upper mirror and the second lower mirror being located between the first upper mirror and the first lower mirror;
    wherein a first optical path for the primary optical mirror system overlaps on a second optical path for the secondary optical mirror system.

2. The armored periscope system of claim 1 wherein the protective housing includes an upper housing and a lower housing, one of said upper housing and said lower housing including a flange that mounts within a projecting rim of the other of the upper housing and said lower housing.

3. The armored periscope system of claim 2 wherein the upper housing is canted from an upper margin relative to a lower margin so that the upper window is protected by the upper margin.

4. The armored periscope system of claim 2 wherein the optical support structure is comprised of an optical quality transmissive material.

5. The armored periscope system of claim 4 wherein the optical support structure includes an upper mirror section, a transition section and a lower mirror section, the upper mirror section supporting the upper window and the first upper mirror of the primary optical system, the lower mirror section supporting the lower window, the first lower mirror of the primary optical mirror section and the second lower mirror of the secondary optical mirror system, and the second upper mirror of the secondary optical mirror system being supported by the upper mirror section and the transition mirror section.

6. The armored periscope system of claim 5 wherein the upper mirror section has a first side wider than an opposing second side, the upper window mounted to the first side.

7. The armored periscope system of claim 4 wherein the optical support structure is a monolithic element.

8. The armored periscope section of claim 4 wherein the optical support structure is comprised of multiple elements.

9. The armored periscope system of claim 2 further comprising a laser filter for protecting the eyesight of crew members.

10. The armored periscope of claim 1 wherein the primary optical mirror system has a field of regard of 24° below to 24° above the horizon.

11. The armored periscope of claim 10 wherein the secondary optical mirror system increases a total field of regard of the periscope to 59° above the horizon.

12. A method for external viewing from within a secure location, the method including:
    mounting a dual path periscope about an operator's station;
    armoring an upper housing of the dual path periscope, the upper housing extending from the secure location;
    connecting the upper housing to a lower housing, the lower housing extending into the operator's station, the upper housing and lower housing defining a first optical path and a second optical path;
    installing an upper window into the upper housing and a lower window into the lower housing, the upper window and lower window protecting a primary optical mirror system including a first upper mirror and a first lower mirror for the first optical path and a secondary optical mirror system including a second upper mirror and a second lower mirror for the second optical path;

positioning the second upper mirror and a second lower mirror between the first upper mirror and the first lower mirror;

viewing through an upper section of the lower window to access the field of regard of the second optical path; and viewing through a lower section of the lower window to access the field of regard of the first optical path.

13. The method of claim 12 further comprising arranging the primary optical mirror system and the secondary optical mirror system such that a transition zone exists between the first optical path and the second optical path wherein there is no field of regard so that the operator can identify the first optical path from the second optical path.

14. The method of claim 12 further comprising arranging an optical support structure such that the optical support structure is within the upper housing and lower housing, the optical support structure including a plurality of external faces for attachment of the primary optical mirror system and the secondary optical mirror system.

15. The method of claim 14 further comprising constructing the optical support structure of a transparent optically transmissive material.

16. The method of claim 12 further comprising positioning the second optical path to increase the field of regard by 35° above the first optical path.

17. The method of claim 12 further comprising disposing a shock pad between the upper housing and an upper primary mirror.

18. The method of claim 12 further comprising selecting the upper housing to have a trapezoidal horizontal cross section so that the upper window is wider than an opposing back wall of the upper housing.

19. The method of claim 12 further comprising arranging the first optical path such that the field of regard for the first optical path is +24° to −24° relative to the horizon.

20. The method of claim 12 further comprising mounting multiple dual path periscopes about the operator's station to provide a near panoramic view.

21. A near panoramic viewing system for an operator inside a military vehicle, the system including a plurality of periscope systems mounted about an operator's station wherein the fields of regard of the individual periscopes overlap;

at least one of said periscopes including two optical mirror systems including a first optical mirror system having a first mirror and a second mirror and a second optical mirror system having a third mirror and a fourth mirror wherein a first optical mirror system field of regard overlaps a second optical mirror system field of regard vertically wherein the first optical mirror system field of regard is directed generally horizontally and the second optical mirror system field of regard in directed substantially above horizontal such that the total vertical field of regard of the viewing system is enlarged in an upward direction as compared to the first optical mirror system field of regard alone.

* * * * *